Dec. 13, 1966  C. R. BENNETT  3,291,545
DEVICE FOR SORTING AND CHECKING FREIGHT BILLS
Filed March 5, 1965
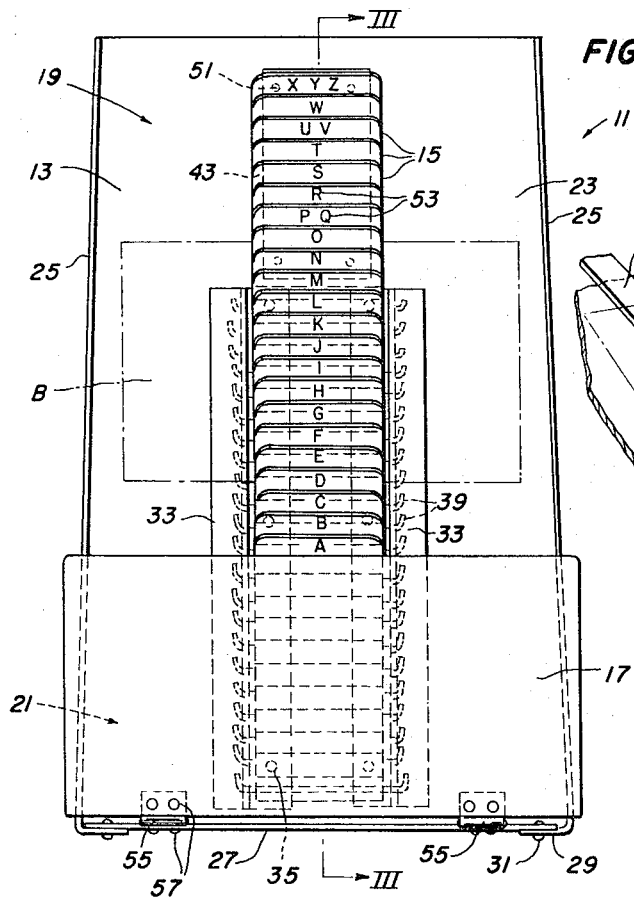
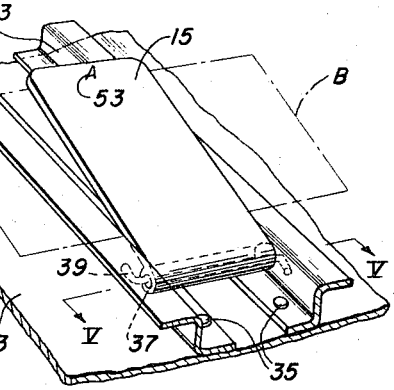
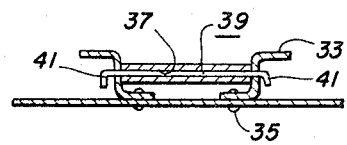
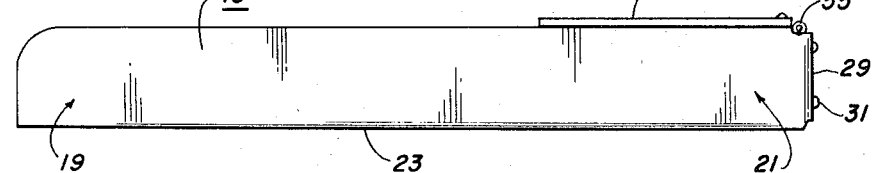
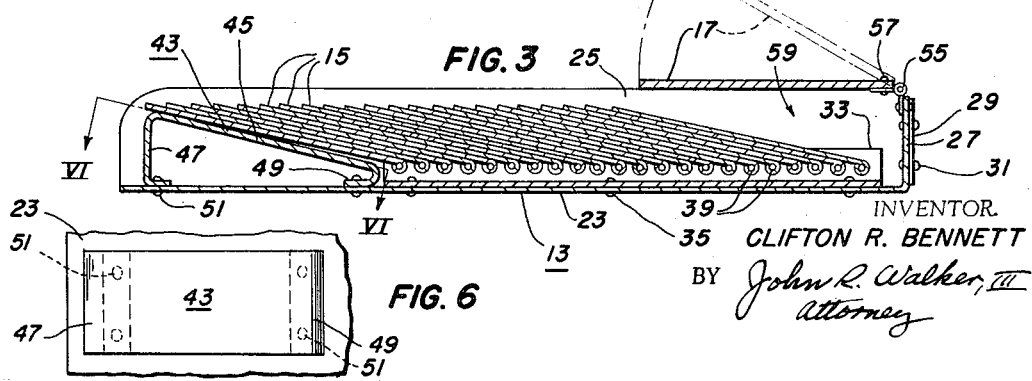
INVENTOR.
CLIFTON R. BENNETT
BY John R. Walker, III
Attorney

United States Patent Office 3,291,545
Patented Dec. 13, 1966

3,291,545
DEVICE FOR SORTING AND CHECKING
FREIGHT BILLS
Clifton R. Bennett, 1051 Sandra St., Memphis, Tenn.
Filed Mar. 5, 1965, Ser. No. 437,393
6 Claims. (Cl. 312—183)

This invention relates to a device for sorting and checking freight bills or the like against freight received at a freight terminal or station. The invention is particularly directed towards such a device for use in highway truck transport terminals.

The typical truck terminal includes an unloading dock or platform for receiving freight items. The typical truckload of merchandise arriving at a terminal is made up of items of material from a number of shippers. The driver of the truck has a freight bill from each shipper. Each bill contains a list or a notation of the item or items received from each shipper, and all the bills together make up the list of the items brought to the station by the truck. A single workman or dockman is usually designated to unload and check-off the merchandise as it is removed from a single truck. Usually, the dockman removes several items from the truck and then checks off the removed items on corresponding freight bills. Freight bills are usually received by the dockman from the truck driver in loose and random arrangement. Most truck docks are out in the open and are windswept, and this hinders the workman in handling the freight bills. Prior to the present invention, considerable time was spent in going through the bills to find the right bill to be checked. Additionally, there was also a likelihood that a bill would be lost, with the resulting inconvenience to the shipper and the receiver.

The present invention seeks to alleviate such problems as above-mentioned and has as a general object to provide a practical device for expeditiously handling or processing freight bills.

A further object is to provide a versatile and self-contained device having (1) means for holding freight bills in sorted or alphabetical order, (2) means providing a writing surface for checking off the items on the bills, and (3) covered enclosure means for conveniently holding the freight bills for items which have been unloaded and checked.

A further object is to provide a lightweight portable device which may be conveniently kept adjacent the truck as it is being unloaded.

A further object is to provide a device which substantially eliminates the likelihood of losing a freight bill.

A further object is to provide a device which is suitable for working out-of-doors and in the wind.

A further object is to provide a device which holds the sorted bills in such a manner that part of the bill may be seen, and thus to aid the dockman in determining the items of merchandise of a particular shipper yet to be unloaded from the truck.

A further object is to provide a plurality of such devices adapted to be used at a single truck terminal and to use or assign one such device to each truck hauling merchandise to the terminal.

A further object is to provide a device of substantially flat configuration, and such configuration that a plurality of the devices may be vertically stacked together for ready transferrence or storage.

A further object is to provide a quickly and easily operable device which does not employ springs, clamps or the like to hold the freight bills, nor requires the use of stands or tables to support the device.

A further object is generally to improve the design and construction of devices for sorting and checking freight bills or the like.

The means by which the foregoing and other objects of the present invention are accomplished and the manner of their accomplishment will be readily understood from the following specification upon reference to the accompanying drawings, in which:

FIG. 1 is a top plan view of the device of the present invention shown holding a freight bill with the bill being shown in broken lines.

FIG. 2 is a side elevational view of the device.

FIG. 3 is a longitudinal sectional view taken as on the line III—III of FIG. 1.

FIG. 4 is a somewhat schematic and fragmentary perspective view of one of the freight bill holding pivoted leaf members, and with a freight bill shown in broken lines.

FIG. 5 is a transverse sectional detail view taken as on the line V—V of FIG. 4.

FIG. 6 is a horizontally oblique view taken as on the line VI—VI of FIG. 3.

Referring to the drawings in which the various parts are indicated by numerals, the device of the present invention is indicated generally by the numeral 11 and includes, basically a base member 13, a plurality of leaf members 15, and a top panel member 17.

For the purpose of clarification in the description, device 11 will be considered as having a forward end and a rearward end, as viewed respectively toward the left and right in FIGS. 2 and 3. Also, in the following description, the device 11 will be defined as being in a typical "in use" position and such a position in which base member 13 extends substantially horizontally.

Base member 13 is preferably constructed of thin flat panel members and includes a forward portion, indicated generally by numeral 19, and a rearward portion, indicated generally by numeral 21. Base member 13 includes a bottom panel 23, a pair of oppositely disposed side panels 25, and an end panel 27. Base member 13 is preferably fabricated from a single sheet of aluminum alloy material. Side panels 25 and end panel 27 are right-angularly formed relative to bottom panel 23. Right-angularly flanged tab portions 29 and opposite portions of end panel 27, fixedly secure the side panels and end panel together. Base member 13 is tapered toward the forward end thereof, as viewed in FIG. 1. Bottom panel 23 is shorter across the forward end than it is across rearward end and upstanding side panels 25 converge slightly toward the forward end of base member 13. The tapered configuration of base member 13 permits a plurality of devices 11 to be stacked vertically with the upper edges of the side panels of a lower device engaging and supporting the bottom panel of an overlying device, which is turned 180 degrees relative thereto.

The plurality of leaf members 15 extend longitudinally and medianly of base member 13. A pair of support members 33 pivotally secure leaf members 15 in juxtaposedly arranged relationship. Members 33 are preferably of Z-shaped cross-section, and each member includes an upper flange portion, a lower flange portion, and a web portion connecting the upper and lower flange portions. Members 33 are parallel spaced and medianly arranged relative to the transverse dimension of bottom panel 23 of the base member 13. Rivets 35, strategically placed along the respective support members 33, extend through bottom panel 23 and fixedly secure the support members to the bottom panel. Leaf members 15 are substantially alike, and each includes a proximal portion and a distal portion. Leaf members 15 are substantially rectangular and preferably formed of aluminum alloy sheet material. The proximal end portion of each of leaf members 15 is rolled downwardly, forwardly and upwardly to provide an aperture 37 extending transversely along the proximal portion of each leaf member. A plurality of pins 39 pivotally secure the plurality of leaf members 15 to support members 33. Pins 39 extend respectively through apertures provided in the respective web portions of support members 33 and apertures 37 in leaf members 15. Leaf members 15 extend respectively horizontally and are disposed in overlying and stacked configuration. The oppositely disposed end portions 41 of pins 39 are preferably right-angularly formed and engage the respective web portions of support members 33 to prevent axial movement of the pins. Aperture 37, extending through each of leaf members 15, preferably is of a larger diameter than is the respective pin 39. This provides limited radial movement of a respective leaf member relative to the respective pin thereof and allows each leaf member to adjust to the thickness of freight bills B held by the leaf members. It should be noted that the leaf members 15 are designated to give maximum holding power on the freight bills. This is due to the fact that the leaf members are approximately twice as long as they are wide so that the angle between adjacent leaves between which a thick stack of bills has been inserted is small compared with what it would be if the leaves were shorter, as for example, if the leaves were only as long as wide. Stated another way, with the relatively long leaf members 15, the bills B can be placed somewhat outwardly from the hinge pins 39, as shown in FIG. 4, and consequently the leaf members can lie flatter against the bills and have more holding power.

A sheet metal plate member 43 is fixedly secured in the forward portion 19 of base member 13. Plate member 43 includes an obliquely extending flat main portion 45 and downwardly extending flanged leg portions 47, 49. Rivets 51, extending respectively through apertures in bottom panel 23 and leg portions 47, 49, fixedly secure plate member 43 to base member 13. Plate member 43 limits the forward pivotal movement of the plurality of leaf members. Also, a freight bill is adapted to be received between main portion 45 of the plate member and the forwardmost one of leaf members 15.

The plurality of leaf members 15 are adapted to be held in overlying and stacked configuration by gravity, and are adapted to be pivoted upwardly so that a freight bill B can be inserted beneath a particular leaf, that is, between that leaf and the next adjacent one. Each of leaf members 15 is provided with a letter or indicia 53 for identifying a freight bill received in each area between adjacent leaf members 15. The letter or indicia 53 is preferably stamped or otherwise incised into the proximal portion of each leaf member 15. The leaf member letters or indicia 53 are preferably arranged in alphabetical order for readily identifying or locating freight bills held by the leaf members.

Top panel member 17 is pivotally secured over the rearward end portion 21 of base member 13. Member 17 is rectangular and preferably formed of aluminum alloy plate material. A pair of butt-type hinges 55 pivotally secure top panel member 17 to base member 13. Rivets 57, extending respectively through the rearward end portion of top panel member 17 and end member 27, fixedly secure the hinges 55 to the base member and plate member. Top panel member 17 is pivotally movable from and to open and closed positions, as best seen in FIG. 3. When in a closed position, top panel member 17 engages the upper edges of side panel 25, is in parallel spaced relationship to bottom 23, and is spaced above the rearward ones of leaf members 15 to define a covered enclosure or compartment 59 in the rearward portion of base member 13. Also, when in a closed disposition, top panel member 17 is adapted to provide a flat horizontal surface for writing on the freight bills.

The specific use of the device of the present invention in unloading a truck will, of course, be left to the discretion of the user of the device, or the use will be determined by the operational procedure of the freight terminal. The following description of use is thus only by way of exemplification.

Considering that a truckload of merchandise is received at a terminal to be unloaded, the following procedure may be carried out:

The dockman receives the freight bills from the truck driver and sorts them into alphabetical order in the plurality of leaves 15 of the device 11 which is assigned to that particular truck. The dockman then removes items of merchandise from the truck and checks it off on the respective freight bills. This is done by removing the bills as needed from the alphabetically sorted bills, and using top panel 17 as a writing surface for checking off the items on the bills. If all the items of a particular bill have not been removed from the truck, the dockman places that bill back in sorted arrangement. If all the items of a particular bill have been removed from the truck, the dockman raises top panel 17 and places the bill in compartment 59. The dockman repeats the freight-removing and bill-checking sequence until all the freight is unloaded and accounted for. A quick glance at the device indicates to the dockman if any bills or items are yet to be handled, since all the bills will be in compartment 59 if all the merchandise to be received at the terminal has been unloaded.

The device of the present invention is lightweight, compact and portable. It is of substantially simple and durable construction and does not include springs, clamps or the like to hold the bills nor does it require tables, stands, carts or the like to support the device. It makes two separations of documents being worked with, that is, one separation is the alphabetical separation of unprocessed documents and the other separation is a group separation of processed documents from unprocessed. The present invention substantially eliminates the likelihood of losing freight bills or items of merchandise. In summary, the present invention provides a very practical device for accurately sorting and checking freight bills and for expediting freight handling.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A portable device for use in sorting and checking freight bills of items received at a freight station comprising a base member having a forward end portion and a rearward end portion and including a horizontal quadrilateral bottom panel member, and two oppositely disposed and spaced side panel members secured to and upstanding from said bottom panel member, a plurality of juxtaposedly arranged leaf members with each leaf member having a proximal portion and a distal portion; pivot mounting means mounting each leaf member respectively at the proximal portion thereof from said bottom panel, each said leaf member being medianly arranged relative to the transverse dimension of said bottom panel member of said base member and pivotally movable fore and aft relative to said base member, said plurality of leaf members being arranged respectively extending horizontally obliquely and in overlying and stacked configuration, said plurality of leaf members being urged toward or held in an obliquely stacked configuration by gravity, adjacent two members of said plurality of leaf members being adapted to be pivotally separated to provide an area for receiving a freight bill, the distal portion of each leaf member having indicia affixed thereon for identifying a freight bill received in each said area between adjacent leaf members; a top panel member and means movably securing said top panel member to said base member; said top panel member being adapted to be moved from an open or closed disposition, when in said closed disposition said top panel member being disposed horizontally only over said rearward end portion of said base member and extending across said spaced side panel members in resting relationship thereon and defining a covered enclosure underneath said top panel member for receiving and holding freight bills, said top panel member being substantially shorter than said base member and exposing portions of said leaf members when in said closed disposition, also when in said closed disposition said top panel member being adapted to provide a flat surface for writing and for checking off items of the freight bills, said top panel member being adapted to be moved to an open disposition for depositing checked freight bills in said covered enclosure.

2. The device of claim 1 which additionally includes obliquely extending plate member means securely attached to said base member at the forward end portion thereof for limiting the forward pivotal movement of said plurality of leaf members and for providing an area for receiving a freight bill between said plate member means and the forwardmost one of said leaf members.

3. The device of claim 1 in which said leaf members are each substantially twice as long as wide.

4. The device of claim 1 in which the space between said side panel members is slightly less than the width of a freight bill to be used with said device and said leaf members are less than half the width of the freight bill whereby when the freight bill is received in said device between and adjacent pair of leaf members a substantial portion of the freight bill projects beyond opposite edges of the leaf members.

5. A portable device for use in sorting and checking freight bills of items received at a freight station comprising a base member having a forward portion end and a rearward portion end and including a horizontal quadrilateral bottom panel member, two oppositely disposed and spaced side panel members secured to and upstanding from said bottom panel member, and an end panel member secured to and upstanding from said bottom panel member at the rearward end of said base member; a plurality of juxtaposedly arranged rectangular leaf members with each leaf member having a proximal portion and a distal portion; pivot mounting means mounting each leaf member respectively at the proximal portion thereof from said bottom panel, each said leaf member being medianly arranged relative to the transverse dimension of said bottom panel member of said base member and pivotally movable fore and aft relative to said base member, said plurality of leaf members being arranged respectively extending horizontally obliquely and in overlying and stacked configuration, said plurality of leaf members being urged toward or held in an obliquely stacked configuration by gravity, adjacent two members of said plurality of leaf members being adapted to be pivotally separated to provide an area for receiving a freight bill, the distal portion of each said leaf member having indicia affixed thereon for identifying a freight bill received in each said area between adjacent leaf members; a substantially rectangular top panel member having a rearward edge portion; and means pivotally securing said top panel member along said rearward edge portion thereof to said base member; said top panel member being adapted to be moved between open and closed dispositions, when in said closed disposition said top panel member resting horizontally only over the rearward end portion of said base member extending across said spaced side panel members in resting relationship thereon and defining a covered enclosure underneath said top panel member for receiving and holding freight bills, said top panel member being substantially shorter than said base member and exposing portions of said leaf members when in said closed disposition, also when in said closed disposition said top panel member being adapted to provide a flat horizontal surface for writing and for checking off items indicated on freight bills, said top panel member being adapted to be moved to an open disposition for depositing checked freight bills in said covered enclosure.

6. A portable device for use in sorting and checking freight bills of items received at a freight station comprising a base member having a forward end portion and a rearward end portion and composed of thin flat panel members and including a horizontal and rectangular bottom panel member, two oppositely disposed and spaced side panel members secured to and upstanding from said bottom panel member, and an end panel member secured to and upstanding from said bottom panel member at the rearward end of said base member; a plurality of juxtaposedly arranged rectangular leaf members with each leaf member having a proximal portion and a distal portion; pivot mounting means mounting each leaf member respectively at the proximal portion thereof from said bottom panel member, each said leaf member being medianly arranged relative to the transverse dimension of said bottom panel member of said base member and pivotally movable fore and aft relative to said base member, said plurality of leaf members being arranged respectively extending forwardly and horizontally obliquely and in overlying and stacked configuration, said plurality of leaf members being urged toward or held in an obliqely stacked configuration by gravity, adjacent two members of said plurality of leaf members being adapted to be pivotally separated to provide an area for receiving a freight bill, the distal portion of each said leaf member having a letter or indicia affixed thereon for identifying a freight bill received in each said area between adjacent leaf members; a substantially rectangular top panel member having a rearward edge portion; and means pivotally securing said top panel member along said rearward edge portion thereof to said end member of said base member; said top panel member being adapted to be moved between open and closed dispositions, when in said closed disposition said top panel member resting horizontally on said side panel members and extending only over the rearward end portion of said base member and defining a covered enclosure underneath said top panel member for receiving and holding freight bills, said top panel member being substantially shorter than said base member and exposing portions of said leaf members when in said closed disposition, also when in said closed disposition said top panel member being adapted to provide a flat horizontal surface for writing and for checking off items indicated on the freight bills, said top panel member being adapted to be moved to an open disposition for receiving checked freight bills in said covered enclosure.

References Cited by the Examiner

UNITED STATES PATENTS

| | | | |
|---|---|---|---|
| 200,173 | 2/1878 | Closterman | 312—231 X |
| 793,642 | 7/1905 | Drain | 312—234.4 X |
| 1,613,440 | 1/1927 | Carek | 312—316 X |
| 2,232,939 | 2/1941 | Cohen | 129—43 |

FOREIGN PATENTS 775,381  12/1934  France.

CLAUDE A. LE ROY, *Primary Examiner.*

C. E. HARRIS, *Assistant Examiner.*